United States Patent [19]

Haytayan

[11] Patent Number: 4,763,562

[45] Date of Patent: Aug. 16, 1988

[54] POPPET VALVE WITH IMPROVED SEAL FOR PNEUMATIC FASTENER DRIVING APPARATUS

[76] Inventor: Harry M. Haytayan, 32 Indian Rock Rd., Nashua, N.H. 03063

[21] Appl. No.: 920,709

[22] Filed: Oct. 20, 1986

[51] Int. Cl.4 ........................ F15B 13/042; F16K 1/46

[52] U.S. Cl. ........................................ 91/461; 277/130; 251/357; 251/900

[58] Field of Search .................. 91/392, 461; 251/357, 251/900; 227/130

[56] References Cited

U.S. PATENT DOCUMENTS

| | | | |
|---|---|---|---|
| 2,696,361 | 12/1954 | Jensen | 251/357 X |
| 2,827,922 | 3/1958 | Guinard | 251/357 X |
| 3,135,332 | 6/1964 | Merdinyan | 251/357 X |
| 3,601,300 | 8/1971 | Anstett | 227/130 X |
| 3,711,008 | 1/1973 | Clifford et al. | 227/130 X |
| 3,731,905 | 5/1973 | Piet | 251/900 X |
| 4,098,171 | 7/1978 | Haytayan | 91/461 |
| 4,319,706 | 3/1982 | Halstead | 227/130 X |
| 4,480,528 | 11/1984 | Shiroyama | 227/130 X |

*Primary Examiner*—John Rivell
*Attorney, Agent, or Firm*—Schiller, Pandiscio & Kusmer

[57] ABSTRACT

A poppet valve having novel seal means for use in a pneumatic fastener apparatus of the kind having a cylinder, a piston slidably mounted for reciprocal movement in the cylinder, a fastener-driving hammer attached to the cylinder, and means including the poppet valve for controlling the application of pressurized air to the piston so as to cause it to execute a work stroke. The seal means comprises an O-ring disposed in a circumferentially-extending groove formed in the outer surface of the poppet valve member and arranged to make a sealing engagement with an end edge surface of the cylinder. More than half of the cross-sectional area of the O-ring is disposed within the groove so that as the poppet valve is driven into closing relation with the cylinder, the O-ring seal is clamped between an annular circumferentially-extending surface of the poppet valve member and the annular end edge surface of the cylinder, thereby providing a secure seal along the full perimeter of the cylinder.

13 Claims, 3 Drawing Sheets

POPPET VALVE WITH IMPROVED SEAL FOR PNEUMATIC FASTENER DRIVING APPARATUS

The present invention relates to a poppet valve for use in a pneumatic fastener device, and more particularly to a poppet valve having a novel seal means for sealing off a piston cylinder.

BACKGROUND OF THE INVENTION

The use of poppet valves in pneumatic fastener driving apparatus for controlling the application of pressurized air to the driving piston is well known, as evidenced by U.S. Pat. Nos. 4,098,171, 4,196,833, 4,227,637, and 4,339,065. Such valves typically comprise a movable valve member adapted for linear travel between pre-set limits, and a resilient sealing means on the movable valve member for making a tight seal with the piston cylinder so as to isolate the piston from the pressurized air supply. Because pneumatic fastener driving apparatus for driving fasteners into steel or concrete typically are powered by air at only about 125–150 psi, it is essential for maximum fastener driving efficiency that effective sealing be achieved between the poppet valve and piston cylinder when the poppet valve is positioned to block application of pressurized air to the piston.

Tradepersons and skilled practioners have recognized that deterioration of the resilient sealing means, as occurs with prolonged use of the pneumatic driver, reduces the effectiveness of the sealing between the poppet valve and the piston cylinder, thereby reducing the speed and power of the apparatus. Unfortunately with known designs it is generally expensive and/or time consuming to replace the poppet valve sealing means, and in some cases it is difficult if not impossible to perform the replacement in the field.

OBJECTS AND SUMMARY OF THE INVENTION

A primary object of this invention is to provide a pneumatic fastener driving apparatus having a novel poppet valve sealing means that is relatively inexpensive and readily replaceable.

Another object of this invention is to provide a poppet valve for a pneumatic driver having an improved sealing means for controlling application of pressurized air to the cylinder of the driver, the sealing means being designed to assure rapid and complete engagement of the poppet valve with the cylinder.

These and other objects of the invention are achieved by utilizing a poppet valve sealing means in the form of an O-ring mounted in a peripheral groove in the poppet valve member and disposed so as to make a tight sealing fit with the cylinder.

Figure 1:
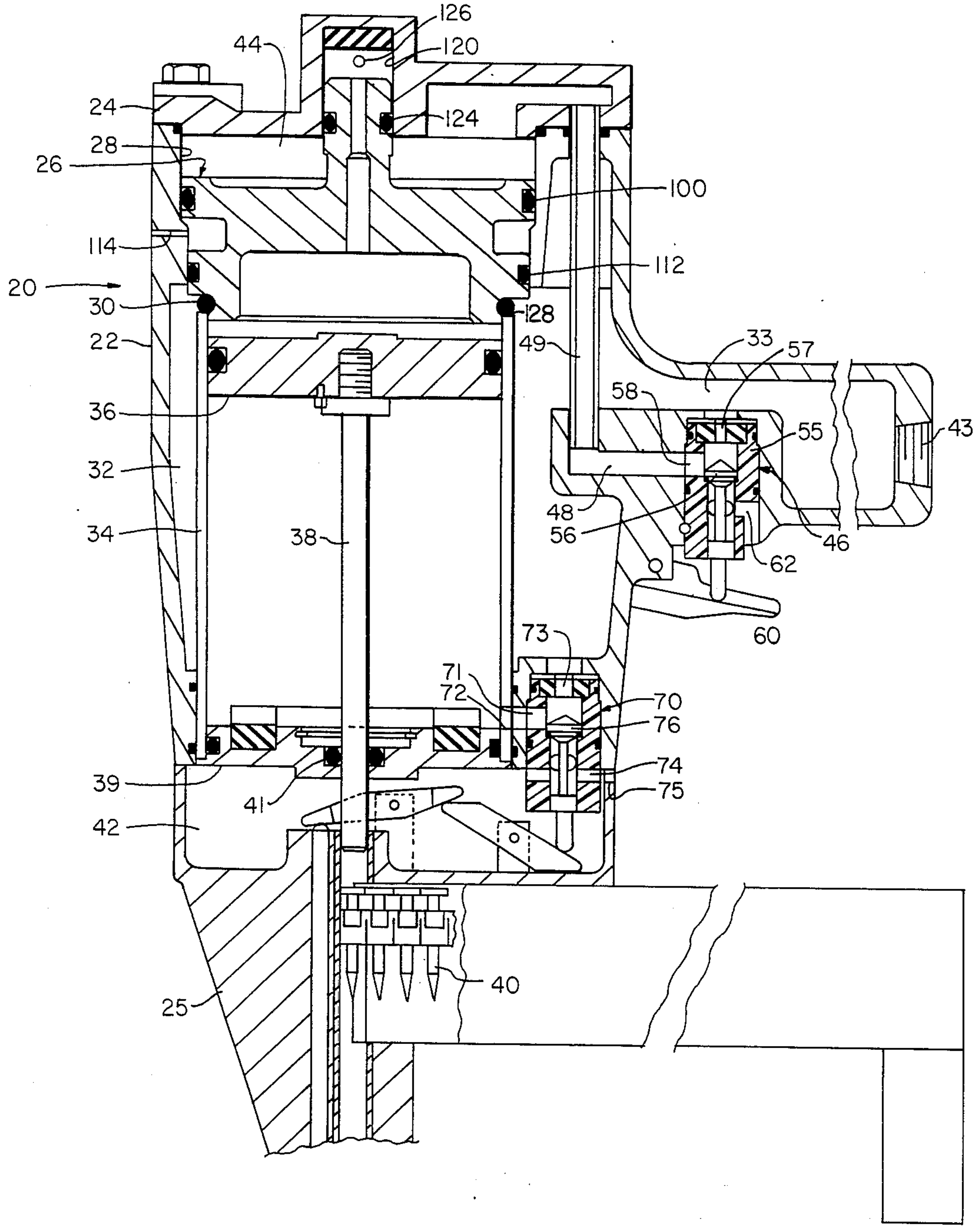
Figure 2:
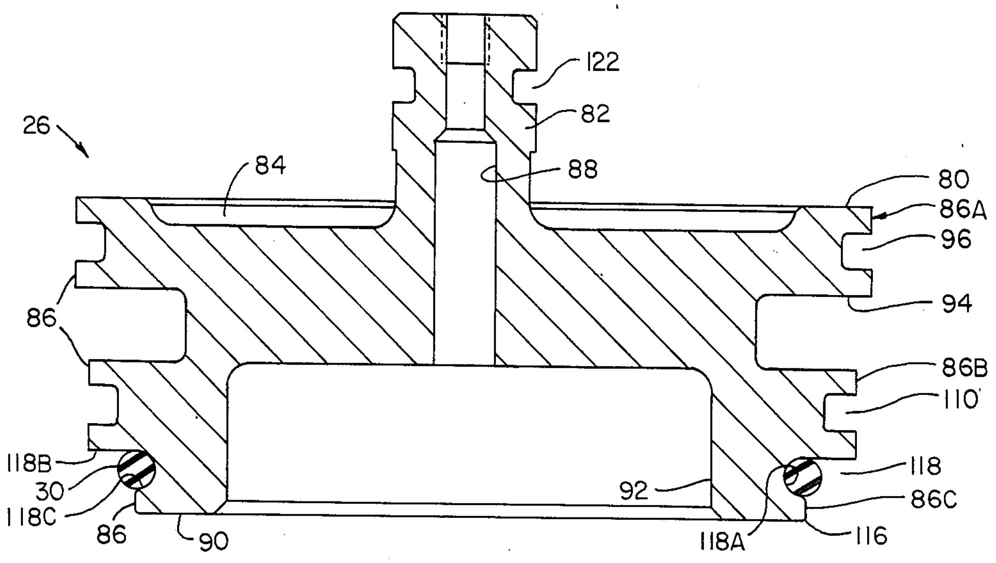
Figure 3:
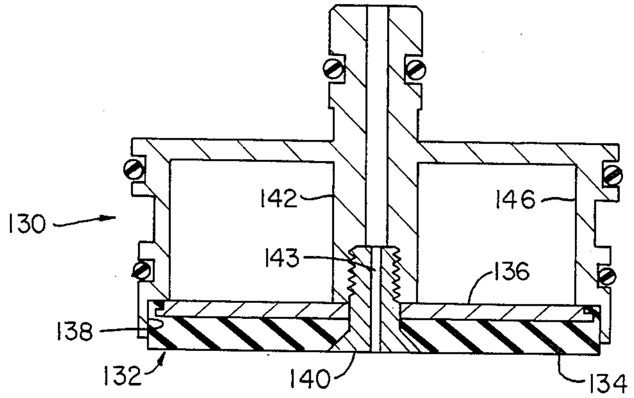
FIG. 3 PRIOR ART

Other objects and advantages of the invention will become apparent from the following detailed specification when considered with the accompanying drawings in which:

FIG. 1 illustrates the preferred form of a pneumatic piston apparatus incorporating the novel features of the present invention;

FIG. 2 is an enlarged elevational view that illustrates the inventive features of the apparatus of FIG. 1 in greater detail; and FIG. 3 illustrates a prior art poppet valve of the type disclosed in U.S. Pat. No. 4,227,637.

Figure 4:
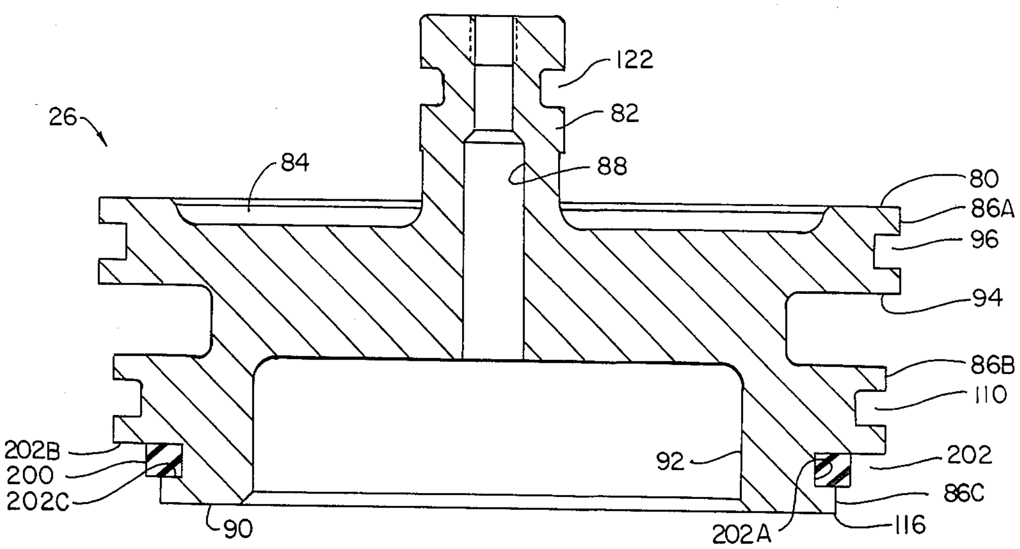

FIG. 4 is an enlarged elevational view that illustrates the inventive features of the alternative embodiment of the invention.

Referring now to the drawings, FIG. 1 shows a pneumatic fastener driving tool 20 which is substantially the same as the apparatus disclosed in U.S. Pat. No. 4,227,637, except that the poppet valve has been modified to incorporate the novel seal means of the present invention. Accordingly, fastener driving tool 20 is described only insofar as is necessary to understand the present invention.

Referring to FIG. 1, tool 20 generally comprises a housing 22 which has a removable cap member 24 attached at one end, and a nozzle 25 disposed at the opposite end. A poppet valve member 26 is slidably disposed in a cylindrical poppet valve bore 28 and has a seal means 30. Housing 22 is configured to define a chamber 32 in which a cylinder 34 is disposed, and a manifold chamber 33 that connects with chamber 32. A drive piston 36 is slidably disposed in cylinder 34 and has a ram-like hammer 38 affixed thereto. Hammer 38 is sized for driving fasteners 40 out of nozzle 25 into a workpiece (not shown). The bottom end of cylinder 34 is closed off by an end wall 39 having an opening through which hammer 38 extends. A resilient sealing ring 41 secured in end wall 39 tightly surrounds hammer 38 and acts to prevent air from passing between the interior of cylinder 34 and a chamber 42 between end wall 39 and nozzle 25.

High pressure air is supplied to manifold chamber 33 and thereby to chamber 32 via a port 43 that is connected to a compressor or other source of pressurized air (not shown). A poppet valve chamber 44 is formed by bore 28 and end cap 24. Chamber 44 is in pneumatic communication with chamber 32 via a control valve 46, a passageway 48, and a conduit 49. Control valve 46 comprises a valve housing 55 secured in a bore in housing 22 and a valve member 56 slidably disposed in housing 55. Housing 55 has an inlet port 57, a side port 58 and an exhaust outlet port 62. Valve member 56 is sized to occlude pneumatic communication between inlet port 57 and side port 58 when moved into contact with the inlet port. Air pressure in manifold chamber 33 normally urges valve member 56 away from inlet port 57 so as to close off exhaust outlet port 62 and also so that pressurized air extends from manifold 33 through ports 57 and 58, passageway 48 and conduit 49 to chamber 44. A trigger 60 is pivotally mounted to housing 22 and contacts valve member 56. Actuation of the trigger moves valve member 56 into closing contact with inlet port 57. Exhaust port 62 is open so as to vent passageway 48 to the outside atmosphere when control valve 56 is positioned by the trigger so as to occlude passage of pressurized air through inlet port 57.

A second like control valve identified generally at 70 has a side port 71 that communicates with the interior of cylinder 34 through a hole 72. Valve 70 also has an inlet port 73 that communicates with chamber 32 and a third exhaust port 74 that is vented to the atmosphere via a hole 75 in housing 22. A slidable valve member 76 is urged by the air pressure in chamber 32 so as to close off exhaust port 74 and open port 73, so that when the tool is at rest pressurized air fills the cylinder 34 below piston 36.

FIG. 2 shows poppet valve member 26 and its attendant seal means 30 in greater detail than in FIG. 1. Valve member 26 is made from a single cylindrical block and includes a top end surface 80, a coaxial cylindrical extension 82, an annular depression 84 in top end surface 80, an outer cylindrical surface 86, an axial bore 88, a bottom end surface 90, and a coaxial counterbore 92 at its bottom end. The diameter of counterbore 92 is preferably equal to between 60 to 80 percent (60%–80%) of that diameter of the portion 86C (hereinafter described) of exterior surface 86.

The outer surface 86 of poppet valve member 26 has a varying diameter, comprising a first section 86A of maximum diameter, a second section 86B of lesser diameter, and a third section 86C of still smaller diameter. Sections 86A and 86B are separated by a groove 94.

In this connection it is to be noted that bore 28 is stepped, having a first relatively large diameter section (i.e. the upper section as viewed in FIG. 1) that is sized so as to make a close sliding fit with poppet valve member surface 86A and a second relatively small diameter section (i.e., the lower section seen in FIG. 1) that is sized so as to make a close sliding fit with poppet valve member surface 86B. Section 86C of the outer surface 86 of the poppet valve member is sized so as to make a close sliding fit in cylinder 34.

Section 86A has a groove 96 for receiving an O-ring 100 (FIG. 1). Section 86B also is flat but has a groove 110 for receiving an O-ring 112 (FIG. 1). O-rings 100 and 112 slidably engage the surrounding wall that defines bore 28 and thus prevent leakage of air past the poppet valve member. Housing 22 has one or more ports 114 that communicate with the second relatively small diameter section of bore 28 so as to vent groove 94 to the atmosphere.

Section 86C makes a rounded or bevelled corner with bottom end surface 90 as shown at 116, and a peripheral groove 118 is formed in that section of surface 86. As seen in cross-section in FIG. 2, groove 118 comprises a circularly curved surface section 118A, that is continuous with flat top and bottom surface sections 118B and 118C, respectively. The top surface section 118B has a greater radial dimension than bottom surface section 118C.

It is to be noted that cap member 24 has a cylindrical bore 120 that is coaxial with poppet valve member 28 and is sized so as to receive in close fit the coaxial extension 82. A peripheral groove 122 is formed in extension 82 and an O-ring 124 is disposed in groove 122. O-ring 124 is sized so as to slidably engage the surface that defines bore 120. Cap member 24 has one or more vent holes 126 that lead from bore 120 to the atmosphere surrounding the tool.

Seal means 30 is disposed in groove 118. Seal means 30 is a conventional resilient O-ring having a circular cross-section. The inside diameter of the O-ring as formed is slightly less than the base diameter of groove 118, i.e., the diameter measured at the midpoint of the curved section 118A, so that the O-ring is stretched when seated in groove 118. The resulting contracting tension causes the inside surface of seal means 30 to tightly grip the poppet valve member 26, thereby insuring that it will remain seated in groove 118. Seal means 30 is made of an elastomer, such as natural or synthetic rubber having desired resiliency, toughness, and wear-resistance properties.

The outside diameter of poppet valve surface 86C is selected so that when seal means 30 is disposed in groove 118, the radial distance between the outer end of bottom surface section 118C and the center axis of the poppet valve member exceeds the corresponding distance between the cross-sectional midpoint of sealing means 30 and the center axis of the poppet valve member, i.e., the first radial distance exceeds the distance $(R_1+R_2)/2$ where $R_1$ and $R_2$ are the outside and inside radii of O-ring 30. Accordingly, less than half of the cross sectional area of seal means 30 projects radially beyond surface section 86C. Preferably the the poppet valve member and O-ring 30 are sized so that more than one quarter but less than half of the cross sectional area of the O-ring seal projects radially beyond the outer surface section 86C. In any event, the top surface section 118B projects radially beyond O-ring 30, so that it acts to support the O-ring when the poppet valve 26 is moved so as to close off cylinder 34.

The operation of tool 20 is described below with enough detail to understand and appreciate the novel aspects of the present invention. For a more complete description of the operation of tool 20, attention is directed to U.S. Pat. No. 4,227,637.

The operation of the tool is as follows: Turning again to FIG. 1, pressurized air, preferably at approximately 125–135 p.s.i., is introduced to tool 20 via port 43. When trigger 60 is in the non-actuated position shown in FIG. 1, pressurized air flows from manifold chamber 33 into poppet valve chamber 44 via control valve ports 57 and 58, passageway 48, and conduit 49. The pressurized air acts on the top surface of poppet valve member 26, thereby forcing the poppet valve member downwardly so that seal means 30 contacts the top edge 128 of cylinder 34 and thus isolates the inside of piston cylinder 34 above piston 36 from chamber 32 and manifold chamber 33. Pressurized air in chambers 32 and 33 acts on the upper surface section 118B of groove 118 and adjoining sections of poppet valve member 26 so as to urge the valve member away from cylinder 34. However, the upper surface area of the poppet valve member 26 exposed to pressurized air in chamber 44 is greater than the surface area of the portion of the poppet valve member exposed to pressurized air in chambers 32 and 33. As a result of this difference in surface areas, the downward pneumatic force acting on poppet valve member 26 is greater than the opposing upward force, and so the poppet valve member remains in sealing engagement with top edge 128 of cylinder 34 so long as control valve port 58 remains open. At the same time, piston 36 remains in the retracted position (as shown in FIG. 1) due to the force exerted by pressurized air admitted to the cylinder through ports 73 and 71 and opening 72, and the fact that the vent holes 126 are not blocked by extension 82. At this time the portion 86C of the poppet valve member is disposed inside the top portion of cylinder 34. Because more than half of the cross-sectional area of O-ring 30 is disposed within groove 118, the top edge 128 of cylinder 34 drives O-ring 30 against the flat annular top surface section 118B of the poppet valve member.

Hammer 38 is actuated to dispense fasteners 40 out of nozzle 25 by depressing trigger 60. Assuming that control valve 70 has been actuated so as to exhaust pressurized air from below piston 36 to the atmosphere, depression of trigger 60 causes control valve member 56 to move upwardly enough to block inlet port 57. When control valve port 57 is blocked, two changes in the pneumatic coupling occur: (1) the supply of pressurized air to chamber 44 is terminated, and (2) chamber 44 is coupled to exhaust port 62 via conduit 49 and passageway 48. As a result of this change in pneumatic coupling, pressurized air existing in chamber 44 escapes through exhaust port 62 so as to reduce the pneumatic force on the upper end of poppet valve member 26 to that of ambient air pressure. Consequently, the upward pneumatic force exerted on poppet valve member 26 is able to drive the valve member upwardly away from cylinder 34. A pathway is thus opened for pressurized air to flow from chamber 32 into the upper end of cylinder 34 and cause piston 36 to drive hammer 38 downwardly into contact with a fastener 40. Continued downward movement of hammer 38 drives the engaged fastener 40 out of nozzle 25 and into a workpiece (not shown).

Upon release of trigger 60, the bias of pressurized air flowing into port 57 urges control valve member 56 downwardly far enough to close off exhaust port 62, thereby permitting pressurized air to flow again into chamber 44 via passageway 48 and conduit 49 and thereby drive the poppet valve 26 downwardly again into sealing engagement with cylinder 34.

Because the tool 20 is designed to be operated with moderate pressure air, i.e., approximately 125–150 p.s.i., and because the top surface area of the poppet valve is relatively large in comparison with its bottom surface area, downward movement of poppet valve member 26 is rapid and causes seal means 30 to impact against top edge 128 with substantial force. Consequently, after thousands of operational cycles seal means 30 will have undergone some deterioration from the impact forces. However, replacement of original seal means 30 is readily and inexpensively accomplished. Corresponding seal means of the kind employed by prior poppet valve art devices also undergo such deterioration, but replacement thereof tends to be relatively difficult and expensive, as is obvious from the following description.

In FIG. 3, a poppet valve member 130, of the type used in U.S. Pat. No. 4,227,637, is shown. In this case, member 130 comprises a circular seal means 132 that comprises a circular resilient pad 134 molded as an integral attachment to a relatively inflexible circular plate 136. Pad 134 and plate 136 are disposed in a force-fit in a seat 138 formed in the sidewall of a hollow valve member 130, and are affixed to that valve member by a screw 140 that extends through the center of the pad and plate and is screwed into a hole in a cylindrical center portion 142 of the valve. Screw 140 has a bore 143 for conducting air through a bore 144 in portion 142. When replacement of seal means 132 is required, valve member 130 is removed from the fastening tool, screw 140 is removed and the seal means 132 is pried out of seat 138. A new pad 134/plate 136 seal means assembly is installed by following in reverse the steps by which the old seal means is removed, with means being required to force the seal means assembly into seat 138.

In comparison to seal means 30 of the present invention, the prior art seal means circular plate 136/pad 134 is relatively expensive to produce because pad 134 must be molded onto plate 136 using a relatively involved molding process. Also, significantly more material is required to produce prior art piston cylinder seals 134/136 than is required to produce the piston cylinder O-ring seal means 30, further adding to the cost of the former.

Referring to FIG. 1, in the present invention, the piston cylinder seal means 30 is readily replaced by removing cap 24 from housing 22, removing valve member 26 from bore 28, removing the deteriorated seal means 30 and replacing it with a new like seal means, reinserting the valve member, and reattaching cap 24 to housing 22. The seal replacement itself may be performed by hand without use of special tools. Thus, seal replacement is a simple, inexpensive procedure which can be performed in the field. Additionally, O-ring type seals are readily available at low cost.

Another obvious advantage of the invention is that the overall weight of the poppet valve is reduced and counterbore 92 (the counterpart of cavity 146 in the prior art valve 130 of FIG. 3) is not sealed off. Decreasing the weight of poppet valve member 26 reduces the inertial force which must be overcome to cause the valve member to move from a stationary position. Reducing this inertial force increases the speed at which the poppet valve member 26 will move in bore 28 in response to a change in pneumatic coupling, which increase in turn increases the overall speed of operation of the tool 20. Additionally, counterbore 92 creates a large portal at the opening of bore 88 to facilitate escape of air from between the poppet valve member and cylinder 34 when the poppet valve is moved to closed position. In the prior art valve 130 shown in FIG. 3, escaping air must initially pass through bore 143 whose reduced diameter restricts the flow of air into bore 144. By providing means for permitting more rapid escape of air through bore 88, the cycling speed of the tool 20 is increased.

Because the other O-ring type seal means 100 and 112 used in tool 20 are not subject to the same large impact force to which seal means 30 is subjected, relatively little deterioration of these other seal means occurs. Nevertheless, if any deterioration does occur, replacement of those other seals is an easy matter.

ALTERNATIVE EMBODIMENT

Referring to FIGS. 2 and 4, O-ring seal means 200 having a square cross-section may be substituted for O-ring seal means 30 (FIG. 2) of the preferred embodiment. Poppet valve 26 is modified to accept O-ring seal means 200 by providing a groove 202 having a square cross-section. Groove 202 corresponds to groove 118 (FIG. 2) of the preferred embodiment. As seen in cross-section in FIG. 4, surface section 202A extends in parallel with the longitudinal axis of poppet valve 26 and flat top and bottom surface sections 202B and 202C, respectively, each intersect surface section 202A at a substantially 90 degree angle. The top surface section 202B has a greater radial dimension than bottom surface section 202C. In every other dimension and feature, the poppet valve of the alternative embodiment illustrated in FIG. 4 is identical to the poppet valve of the preferred embodiment illustrated in FIGS. 1 and 2.

O-ring seal means 200 is made of an elastomer, such as natural or synthetic rubber having desired resiliency, toughness, and wear-resistance properties. The inside diameter of O-ring seal means 200 is slightly less than the diameter of groove 202 as measured at surface 202A so that the O-ring is stretched when seated in groove 118. The resulting contracting tension causes the inside surface of seal means 200 to tightly grip the poppet valve member 26, thereby insuring the seal means will remain seated in groove 202.

The outside diameter of poppet valve surface 86C is selected so that when seal means 200 is disposed in groove 202, the radial distance between the outer end of bottom surface section 202C and the center axis of the poppet valve member exceeds the corresponding distance between the cross-sectional midpoint of sealing means 200 and the center axis of the poppet valve member, i.e., the first radial distance exceeds the distance $(R_1+R_2)/2$ where $R_1$ and $R_2$ are the outside and inside radii of O-ring 200. Accordingly, less than half the cross sectional area of seal means 200 projects radially beyond surface section 86C. Preferably the poppet valve member and O-ring 200 are sized so that more than one quarter but less than half of the cross sectional area of the O-ring seal projects radially beyond the outer surface section 86C. In any event, the top surface section 202B projects radially beyond O-ring 200, so that it acts to support the O-ring when the poppet valve 26 is moved so as to close off cylinder 34.

The operation of tool 20 having the poppet valve and seal means of the alternatiave embodiment is identical to the operation of the tool 20 having the poppet valve and seal means of the preferred embodiment. Also, seal means 200 is replaced following the same procedure described above for replacing seal means 30.

Since certain changes may be made in the above pneumatic piston apparatus without departing from the scope of the invention herein involved, it is intended that all matter contained in the above description or shown in the accompanying drawing shall be interpreted in an illustrative and not in a limiting sense.

What is claimed is:

1. A poppet valve member comprising:

a unitary cylindrical block having a cylindrical peripheral surface, first and second ends, and a bore extending from said first end to said second end;

said peripheral surface comprising a plurality of portions of different diameters axially displaced from one another, a first one of said peripheral surface portions being adjacent said second end and having a circumfernetial groove formed entirely therein, and a second one of said peripheral surface portions being positioned adjacent said first peripheral surface portion, said second periperhal surface portion having a greater diameter than said first peripheral surface portion;

said groove comprising in cross-section a flat bottom section, a flat top section that intersects said second peripheral surface portion, and a circularly curved intermediate section extending between and continuous with said flat top and bottom sections;

a resilient O-ring having a circular cross-section, said O-ring being disposed in said groove so that the inner side of said O-ring contacts said circularly curved section;

said second peripheral surface portion having a diameter greater than the outer diameter of said O-ring, and said first peripheral surface portion having an outer diameter that is less than the outer diameter of said O-ring and a radius that is greater than the radial distance between the longitudinal axis of said block and the cross-sectional midpoint of said O-ring.

2. A poppet valve member according to claim 1 further comprising:

a coaxial extension on said block at said first end with said bore extending though said extension; and a counterbore formed in said second end of said block.

3. A poppet valve member according to claim 2, wherein the inside diameter of said counterbore is equal to between 60 and 80 percent of the outside diameter of said first peripheral surface portion.

4. A poppet valve member according to claim 1 further comprising at least one peripheral groove in said second peripheral surface portion, and an O-ring mounted in said peripheral groove.

5. A poppet valve member according to claim 1, wherein said radius of said first peripheral surface portion is selected so that more than one quarter but less than one half of the cross-sectional area of said O-ring projects radially beyond said first peripheral surface.

6. A pneumatic fastener driver apparatus comprising:

a cylinder having a cylindrical end edge surface;

a piston slidably disposed within said cylinder for reciprocal movement along the axis of said cylinder in response to the application of air pressure;

air pressure control means including a poppet valve member for controlling the application of air pressure differential to said piston so as to cause said piston to be driven in said cylinder in one direction or the other according to the magnitude and direction of said air pressure differential;

said poppet valve member being mounted for reciprocal movement in an axial direction toward and away from said cylinder and having seal means engageable with said end edge surface;

said poppet valve member comprising a unitary cylindrical block having a cylindrical peripheral surface, first and second ends, and a bore extending from said first end to said second end;

said peripheral surface comprising a plurality of cylindrical portions of different diameters axially displaced from one another, a first one of said peripheral surface portions being adjacent said second end and having a circumferential groove formed entirely therein, and a second one of said peripheral surface portions being adjacent said first peripheral surface portion between said first peripheral surface portion and said first end, said second peripheral surface portion having a greater outside diameter than said first peripheral surface portion;

said groove comprising in cross-section a flat bottom section, a flat top section that intersects said second peripheral surface portion, and a circularly curved intermediate section extending between and continuous with said flat top and bottom sections;

said seal means comprising a resilient O-ring that has a circular cross-section, said O-ring being disposed in said groove so that the inner side of said O-ring contacts said circularly curved section; and said second peripheral surface portion having a diameter greater than the outer diameter of said O-ring, said O-ring having an outer diameter greater than the inner diameter of said end edge surface, and said first peripheral surface portion having an outer diameter that is less than the outer diameter of said O-ring and a radius that is greater than the radial distance between the longitudinal axis of said block and the cross-sectional midpoint of said O-ring, whereby when said poppet valve member is moved into closing relation with said cylinder, said O-ring makes a sealing engagement with said end edge surface and is clamped between an annular circumfernetially-extending surface of the poppet valve member and said end edge surface, thereby providing a secure air-tight seal along the full perimeter of the cylinder.

7. Apparatus according to claim 6 further comprising:

a coaxial extension on said block at said first end with said bore extending though said extension; and a counterbore formed in said second end of said block.

8. A poppet valve member according to claim 7, wherein the inside diameter of said counterbore is equal to between 60 and 80 percent of the outside diameter of said first peripheral surface portion.

9. Apparatus according to claim 6 further comprising at least one peripheral groove in said second peripheral surface portion, and an O-ring mounted in said peripheral groove.

10. Apparatus according to claim 9 wherein said poppet valve member is mounted for reciprocal movement in a multi-diameter bore, and further comprising another peripheral groove in said poppet valve member between said one peripheral groove and said circumferential groove, and means for venting said the annular space between said multi-diameter bore and said another peripheral groove.

11. Apparatus according to claim 6 wherein said second end of said block is sized so as to fit within said cylinder when said O-ring is engaged with said end edge surface.

12. A poppet valve member according to claim 6, wherein said radius of siad first peripheral surface portion is selected so that more than one quarter but less than one half of the cross-sectional area of said O-ring projects radially beyond said first peripheral surface.

13. A poppet valve member comprising:

a unitary cylindrical block having a cylindrical peripheral surface, first and second ends, and a bore extending from said first end to said second end;

said peripheral surface comprising a plurality of portions of different diameters axially displaced from one another, a first one of said peripheral surface portions being adjacent said second end and having a circumfernetial groove formed entirely therein, and a second one of said peripheral surface portions being positioned adjacent said first peripheral surface portion, said second peripheral surface portion having a greater diameter than said first peripheral surface portion;

said groove comprising in cross-section a flat bottom section, a flat top section that intersects said second peripheral surface portion, and a flat intermediate section extending between and normally to said flat top and bottom sections;

a resilient O-ring having a square cross-section, said O-ring being disposed in said groove so that the inner side of said O-ring contacts said flat intermediate section;

said second peripheral surface portion having a diameter greater than the outer diameter of said O-ring, and said first peripheral surface portion having an outer diameter that is less than the outer diameter of said O-ring and a radius that is greater than the radial distance between the longitudinal axis of said block and the cross-sectional midpoint of said O-ring.

* * * * *

UNITED STATES PATENT AND TRADEMARK OFFICE

CERTIFICATE OF CORRECTION

PATENT NO. : 4763562

DATED : August 16, 1988

INVENTOR(S) : Harry M. Haytayan

It is certified that error appears in the above-identified patent and that said Letters Patent is hereby corrected as shown below:

Claim 2, column 7, line 60, the word "though" should be -- through --;

Claim 10, column 9, line 18, the word "said" should be deleted;

Claim 12, column 9, line 27, the word "siad" should be -- said --.

Signed and Sealed this

Tenth Day of January, 1989

*Attest:*

DONALD J. QUIGG

*Attesting Officer*

*Commissioner of Patents and Trademarks*